(12) United States Patent
Heilweil et al.

(10) Patent No.: US 9,182,653 B2
(45) Date of Patent: Nov. 10, 2015

(54) CONVERTIBLE MOBILE SURVEILLANCE CAMERA ENCLOSURE FOR SELECTIVELY PROTECTING CAMERA DOME

(71) Applicants: Jordan Heilweil, Suffern, NY (US); Richard Heilweil, Milton, NY (US); Frank Giunta, Woodbridge, NJ (US)

(72) Inventors: Jordan Heilweil, Suffern, NY (US); Richard Heilweil, Milton, NY (US); Frank Giunta, Woodbridge, NJ (US)

( * ) Notice: Subject to any disclaimer, the term of this patent is extended or adjusted under 35 U.S.C. 154(b) by 0 days.

(21) Appl. No.: 14/505,390

(22) Filed: Oct. 2, 2014

(65) Prior Publication Data

US 2015/0212393 A1 Jul. 30, 2015

Related U.S. Application Data

(60) Provisional application No. 61/885,715, filed on Oct. 2, 2013.

(51) Int. Cl.
*G03B 17/00* (2006.01)
*G03B 17/04* (2006.01)
*G03B 17/56* (2006.01)

(52) U.S. Cl.
CPC .............. *G03B 17/04* (2013.01); *G03B 17/561* (2013.01)

(58) Field of Classification Search
CPC .................. G03B 17/04; G03B 17/561; G08B 13/19619; H04N 7/18; H04N 5/225
See application file for complete search history.

(56) References Cited

U.S. PATENT DOCUMENTS

| | | | |
|---|---|---|---|
| 3,993,866 A | 11/1976 | Pearl et al. | |
| 4,160,999 A | 7/1979 | Claggett | |
| 5,852,754 A | 12/1998 | Schneider | |
| 6,268,882 B1 * | 7/2001 | Elberbaum | 348/151 |
| 6,354,749 B1 | 3/2002 | Pfaffenberger | |
| RE37,709 E | 5/2002 | Dukek | |
| 6,735,382 B2 | 5/2004 | Schneider | |
| 8,137,009 B2 | 3/2012 | Cirker | |
| 8,790,024 B2 * | 7/2014 | Andersson | 396/427 |
| 2005/0270414 A1 * | 12/2005 | Lee | 348/373 |
| 2008/0100707 A1 | 5/2008 | Brown | |
| 2009/0096918 A1 | 4/2009 | Montelongo | |
| 2010/0239241 A1 * | 9/2010 | Chou | 396/427 |
| 2014/0015981 A1 * | 1/2014 | Dietl | 348/159 |
| 2014/0104488 A1 * | 4/2014 | Samuels et al. | 348/374 |

* cited by examiner

*Primary Examiner* — W B Perkey
(74) *Attorney, Agent, or Firm* — Myron Greenspan; Lackenbach Siegel LLP

(57) ABSTRACT

An enclosure for a surveillance camera includes a housing having front, rear, top, bottom and opposing side walls. A camera dome projects downwardly below the bottom wall. A support structure includes a vertical channel attachable to a vertical post for supporting the housing on a post. A cover is selectively attachable to both the top and bottom walls, the cover normally being attached to the bottom wall to cover and protect the camera dome during transport or when surveillance is not required and attached to said top wall to expose said camera dome when in use during surveillance. The top and bottom walls are provided with connecting members for easily removing or securing the cover by flipping it 180° when moving the cover between the top and bottom walls of the housing when mounted on the support structure and post.

20 Claims, 18 Drawing Sheets

CONVERTIBLE MOBILE SURVEILLANCE CAMERA ENCLOSURE FOR SELECTIVELY PROTECTING CAMERA DOME

BACKGROUND OF THE INVENTION

1. Field of the Invention

The present invention generally relates to surveillance systems and, more specifically, relates to mobile surveillance camera convertible enclosure for protecting camera dome during transportation.

2. Description of the Prior Art

Surveillance cameras are widely used for security and monitoring purposes. In some circumstances, the surveillance cameras are enclosed within housing such as disclosed in U.S. Pat. Nos. 6,735,382; 6,354,749 and 5,852,754. These housings generally shelter the surveillance camera from the elements, protect the camera from vandalism, conceal the camera from view to prevent distracting from the aesthetic quality of an area, and the like.

While existing monitoring systems have traditionally been adequate for their intended purposes, they have not been satisfactory in all respects. For example, many cameras are mounted by fixing them to a light post or utility pole in a manner that does not always allow easy and simple removal while securing the camera housings or enclosures. Also, because these cameras tend to be costly, municipalities have not always been able to place these cameras at all locations of interest. Likewise, promoters of events, such as street fairs, parades, etc. frequently desire to provide such surveillance cameras short term to protect the safety of the public attending such events. However, the locations where such events take place are not always equipped with surveillance cameras. Leasing such units even for temporary use requires transport to and from the location and handling at the locations requiring easy and quick installation of units without damaging the equipment and, in particular, the delicate camera dome that typically projects beyond the walls of the camera enclosure. Use of packing materials has not proved satisfactory since these can still make contact with the outside surface of the dome and, therefore, scrape and scratch it. Also, this is not a "green" solution since such packing materials, such as foam bubbles, molded foam blocks, paper, etc, are frequently discarded after use. Thus, the existing enclosure and mounting structures have not promoted mobility, ease of use and neither secure mounting nor promoting the movement of rented or leased units for temporary use at different locations such as special events or enhancing security in trouble areas.

Published patent application 2009/0096918 is for a protected security monitoring box. However, the lens of the camera stays exposed outside the housing. The camera is mounted so that its angle of inclination can be adjusted to accommodate the needs of the space that is being monitored.

In Published patent application 2008/0100707 a temporary surveillance system is disclosed. While this reference primarily discloses the use of conventional cameras with a dome mounted on a post there is no discussion about protecting this dome during transport or use.

A camera enclosure is disclosed in U.S. Pat. No. 8,137,009. The patent is primarily concerned with blocking or disabling the camera to protect the privacy of individuals in the area. However, this can be overridden in the case of emergencies or special situations at which times the blocking members or elements can be moved to expose the camera and enable it. This can be done by remote control. The case or housing is not used to protect the dome during transport as the unit appears to be permanently affixed to a horizontal surface such as a ceiling.

Reissue Pat. 837709 is for a system for recording and modifying behavior of passenger in passenger vehicles. The system includes housing for a camera the lens of which is always enclosed within the housing. A hinged cover can be opened to access the camera since the camera is always within the housing the camera is not at least partially mounted within a hemispherical dome that is positioned outside of the housing.

U.S. Pat. No. 4,160,999 is for a mounting arrangement for a television monitoring camera. However, this camera, as well, is permanently mounted in what appears to be a suspended ceiling. The cover does move between open and closed hinged positions but this is to provide access to the interior of the enclosure for purposes of maintenance. This arrangement is not designed for transporting a portable surveillance system that utilizes a dome or spherical lens that protrudes beyond a housing or enclosure.

U.S. Pat. No. 3,993,866 is for a camera capsule. This patent discusses the camera housing and how it can be packaged and shipped in a way that causes a base portion to protect the dome during storage and shipment. However, this involves inserting the dome in an inverted position with respect to the base so that the dome projects into the base portion. It is only after the dome is placed in this position that the dome remains untouched during shipment. This protects the chromium applied to the concave surface of the dome and so that the dome does not become scratched or otherwise distorted or damaged. However, requiring the dome to be manually gripped and inverted or flipped is not a practical solution since inevitably the coating can be contacted and the dome can be scratched or otherwise damaged when it is transitioned from one position to another. It also opens the possibility for the dome to be inadvertently dropped when it is detached from the case and handled in an attempt to reverse its orientation.

SUMMARY OF THE INVENTION

Accordingly, it is an object of the present invention to provide a mobile surveillance camera convertible enclosure that overcomes the disadvantages that are inherent in presently known surveillance camera enclosures.

It is another object of the invention to provide a camera enclosure that is suitable for transportation from one location to another for temporary surveillance use at given locations, such as for events, periodic monitoring, etc.

It is still another object of the invention to provide a mobile surveillance camera enclosure that protects the projecting dome or lens of a camera within the enclosure during transport and during storage.

It is yet another object of the invention to provide a mobile surveillance camera enclosure as in the previous objects that is simple in construction and economical to manufacture.

It is a further object of the invention to provide a mobile surveillance camera enclosure of the type under discussion that obviates the need to consume and discard packing materials, such as foam panels, foam bubbles, bubble wrap, etc. for covering and protecting the dome of a camera enclosure during storage and transport.

It is still a further object of the invention to provide a mobile surveillance camera enclosure as suggested in the previous objects that is simple and convenient to use and can be quickly mounted and de-mounted at a site to be monitored and requires no tools to do so.

In order to achieve the above and other objects, it will become evident hereinafter, a mobile surveillance camera enclosure for protecting a camera dome during transport includes a main case of the enclosure for housing the surveillance camera with its associated electronics components. The case has a removable cover normally attached to the lower end of the case to cover and protect the dome without contacting the dome which, in turn, protects the video camera during storage and transport. A support structure is mountable on a pole at a location where surveillance is to take place and includes straps for accommodating poles of different sizes the securing the support structure to the pole. The support structure includes a first surface suitable for abutment against a surface of said enclosure and a second surface suitable for abutment against the pole. Detachable connecting members are provided for selectively securing the case to the support structure. Once the case is securely mounted on a pole, a lower removable protective cover initially mounted on the bottom of the case can be removed by means of suitable fasteners, such as separatable hinges, and flipped 180° and securely mounted and attached using similar fasteners at the top of the enclosure where it is retained until the camera enclosure is to be removed from the pole at which time the cover is replaced on the bottom of the case to cover and protect the camera dome to ready the unit for transport.

BRIEF DESCRIPTION OF THE DRAWINGS

Those skilled in the art will appreciate the improvements and advantages that derive from the present invention upon reading the following detailed description, claims, and drawings, in which:

FIG. 20 is a rear perspective view of the cabinet and post support channel without the posts.

DESCRIPTION OF PREFERRED EMBODIMENTS

Figure 1:
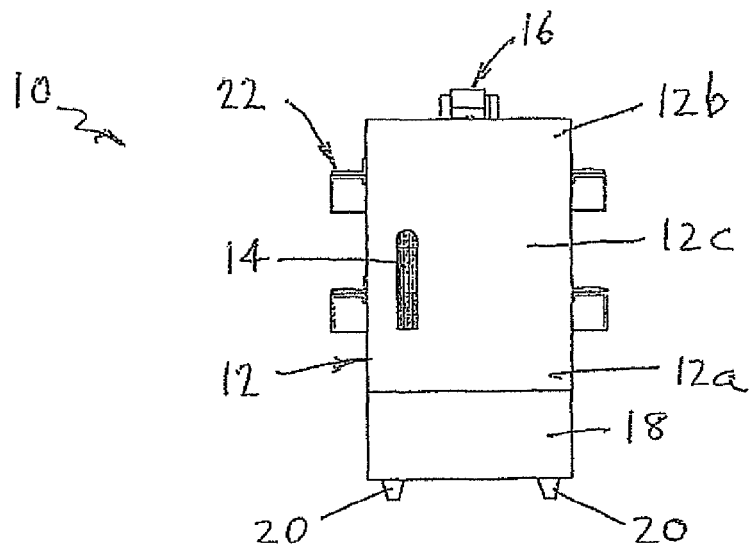
FIG. 1 is a front elevational view of the mobile surveillance camera convertible enclosure in accordance with a first embodiment of the present invention, shown with a support structure in the background on which it is can be mounted.

Referring now specifically to the Figures, in which identical or similar parts are designated by the same reference numerals throughout, and first referring to FIG. 1 a first embodiment of a mobile surveillance camera convertible enclosure for protecting a camera dome during transport is generally designated by the reference numeral 10.

The enclosure 10 includes a main case or housing 12 having a bottom or proximate end 12a and a top or remote end 12b and a front door or panel 12c for accessing the internal compartment of the case that houses the surveillance camera and associated electronic components. A front access door handle 14 can be used to open and close the front door or panel 12c to provide access to the case.

A carrying handle 16 is provided for carrying the ease or housing during transport from a storage location to a location to be watched or between any such locations.

An important feature of the present invention is the provision of a removable cover 18, shown secured to the bottom or proximate end 12a of the case. The cover 18 is normally secured to the case as shown during storage and/or transport of the enclosure from one location to another. The cover 18 is preferably provided with rubber feet 20 for protecting the cover 18 when the enclosure is placed on the ground or other surface.

Figure 2:
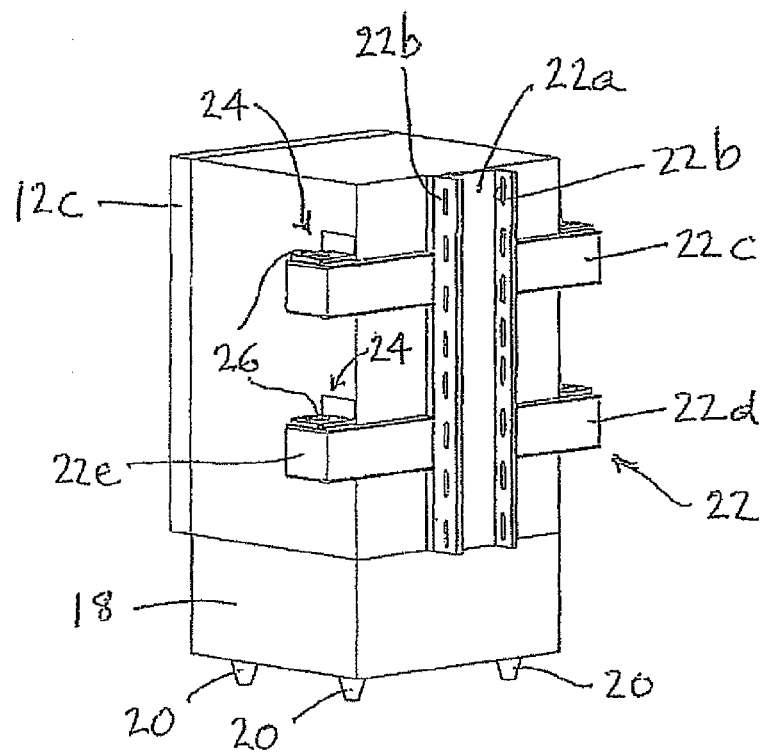
FIG. 2 is a rear perspective view of the enclosure shown in FIG. 1, showing details of the support structure connectable to a pole during use and the support brackets or flanges on the enclosure for securing same to the support structure.
Figure 4:
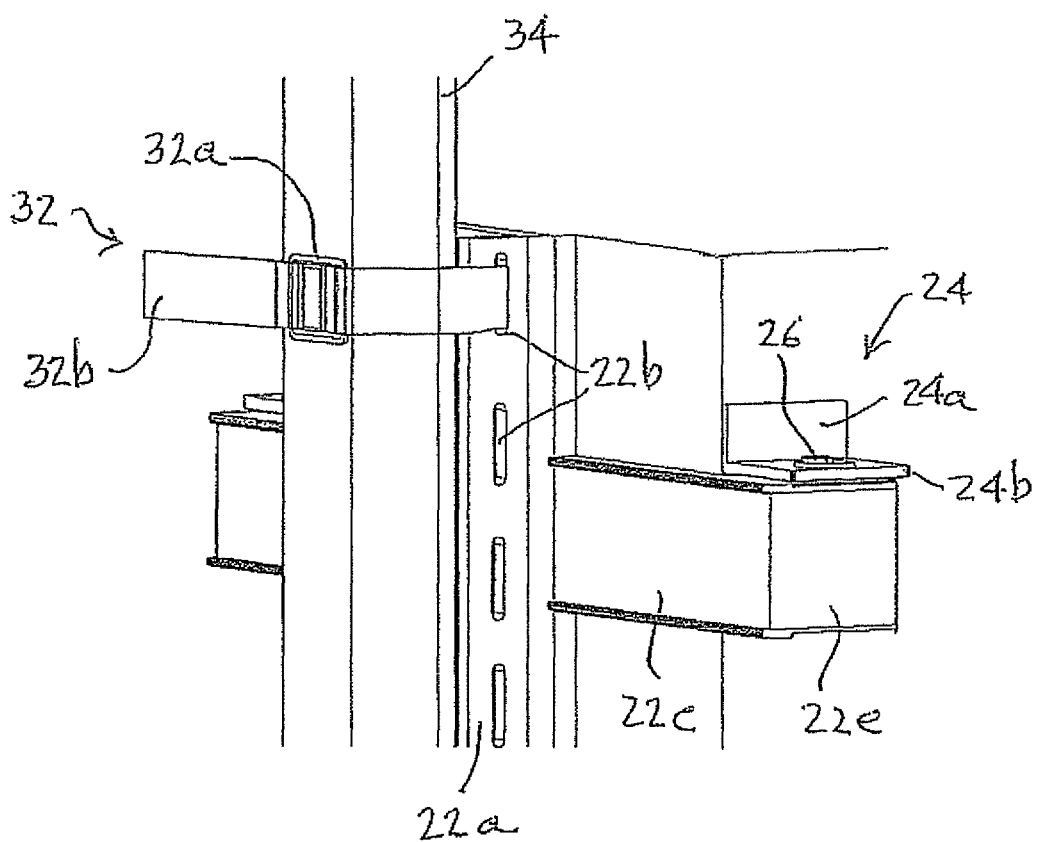
FIG. 4 is a rear perspective view of details of the support structure and the manner in which the support structure is attached to the pole.

Also referring to FIG. 2, a support structure generally designated by the reference numeral 22 is used to support the enclosure 10 on a pole or the like during use. The support structure 22 includes an upright U-shaped channel 22a provided with spaced opposing pairs openings or slots 22b. An upper arm 22c and a spaced lower arm 22d are secured to the upright channel 22a. The arms 22c and 22d have a generally U- or C-Shaped configuration to provide inwardly directed connecting portions 22e. The connecting portions 22e on each arm 22c and 22d are spaced from each other distances generally corresponding to the width of the enclosure, housing or case 12 to substantially abut against the sides of the case with some small clearance to allow easy and quick positioning of the case between the connecting portions and abutment against the channel 22a as will be described while preventing excessive lateral movements. L-Shaped brackets or flanges 24 provided on the sides of the case or housing 12 are positioned generally above the connecting portions 22e when the case is to be mounted on a support structure 22, each of the brackets 24 having a vertical portion 24a fixedly secured to the side of the case or housing, such as by welding, and a horizontal portion 24b that extends outwardly to be positioned generally directly above an associated connecting portions 22e. The horizontal portions are provided with a hole for receiving of a ball-lock pin or other suitable fastener for quickly, easily and conveniently locking the case or housing 12 on the arms 22c, 22d and prevent inadvertent separation thereof when the case or housing is mounted on the support structure 22. The lock pin 26 may be provided, for example, with a ring 26' that can be readily gripped by a user and pulled upwardly to unlock the lock pin and allow the enclosure to be lifted and separated from the arms 22c, 22d when it is desired to move the unit. Referring to FIG. 4, there is shown a phantom outline, a lock member 28 that can cooperate with the lock pin 26 to retain the lock pin in place and allow separation only when the ring 26' is pulled upwardly to retract the ball in the lock pin and allow the removal of the pin. Alternatively, if the arms 22c, 22d are U-channels, a hole in the upper surface can also receive the pin and serve a similar function. The fastening method described is a presently preferred method of securing the closure to the support structure. However, it will readily evident to those skilled in the art that other fasteners, including linkage pins, draw bars, clips and other fasteners can be used, with different degrees of advantage. Any such fastener can be used that is convenient and easy use to quickly and easily attach or remove the housing to the support structure or securely fix it to that structure.

Figure 3:
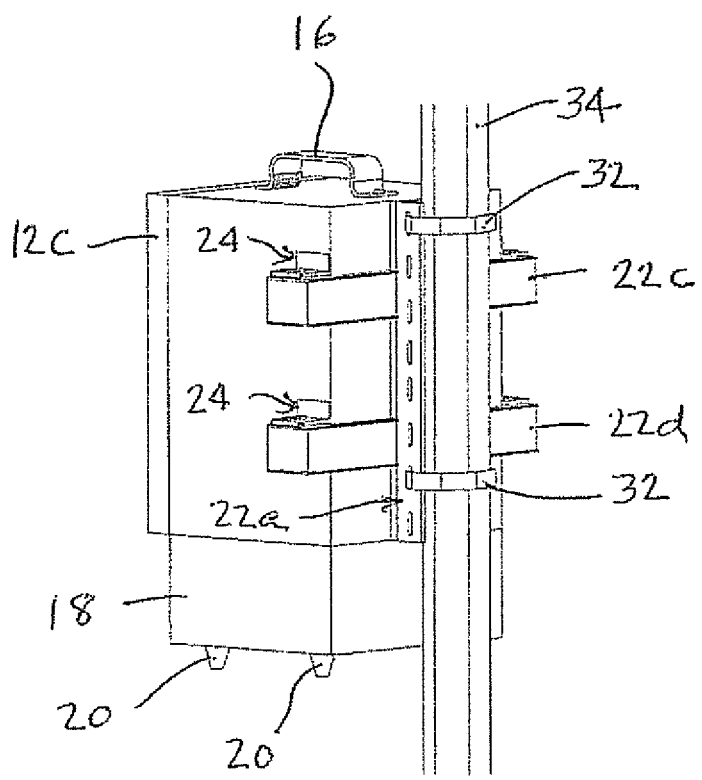
FIG. 3 is similar to FIG. 2, and shows the manner in which the support structure and the enclosure mounted thereon are attached to a pole prior to removal of the lower cover and exposure of the mobile surveillance camera dome.
Figure 5:
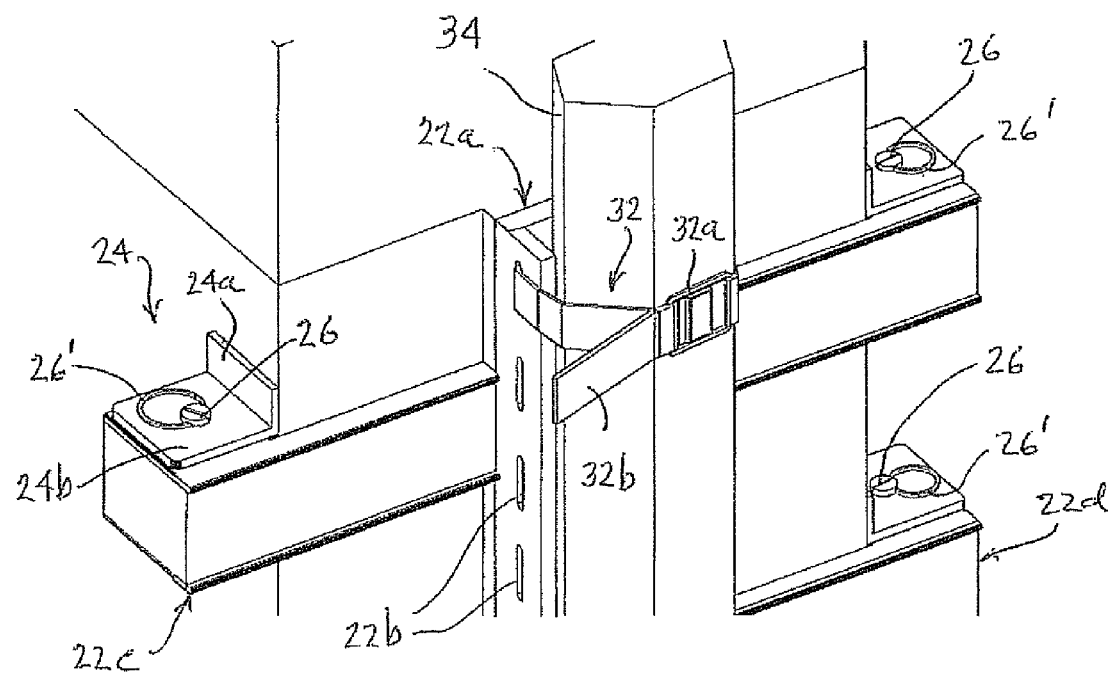
FIG. 5 is similar to FIG. 4 showing a perspective view from the opposite side and illustrating additional details of the connectors for securing the case to the support structure.
Figure 6:
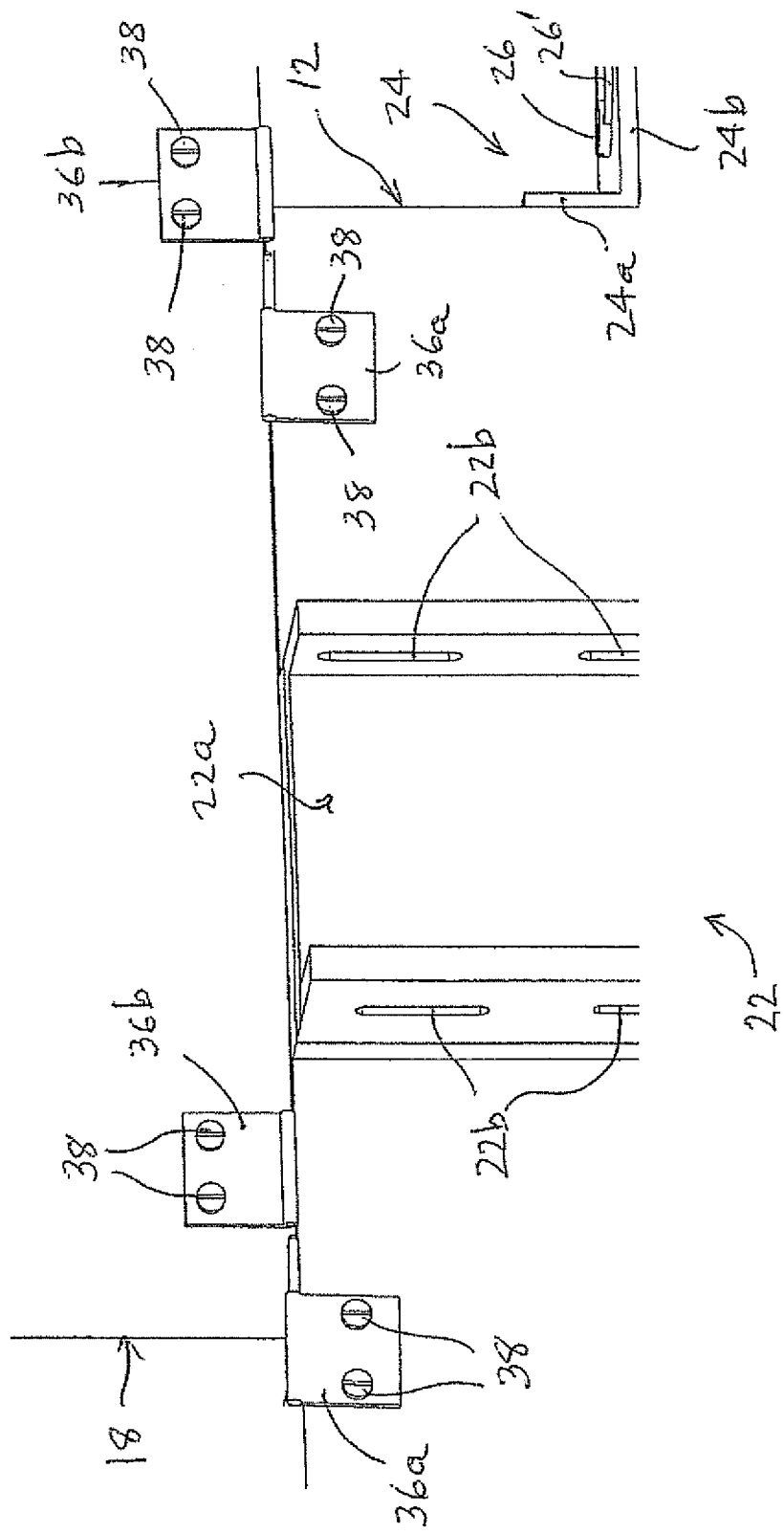
FIG. 6 is an enlarged fragmented view of the construction shown in FIGS. 1-5 and illustrates the separatable hinges that allow the removal of the protective cover to be removed from the top of the case and attached to the bottom, and vice versa.

Referring to FIGS. 3-5, straps 32 are shown used to secure the support structure 22 to a pole 34. Each strap is provided with a buckle 32a and a free end 32b that can be passed through the buckle for adjusting the strap and tightening it about a pole. The strap 32 may be made of a strong nylon material, although other materials can also be used, with different degree of advantage. Adjustable clamps may also be used made of metal or plastic. The enclosure mounting bracket that is illustrated in U.S. Pat. No. 6,185,303 that uses an adjustable strap that extends about a pole and a ratchet device for drawing the strap in and tightening it about the pole can also be used. The aforementioned patent is incorporated as it fully set forth herein for the disclosure of such enclosure mounting bracket. The specific method of attaching or securing the support structure to a pole is not critical for the purposes of the present invention.

Figure 7:
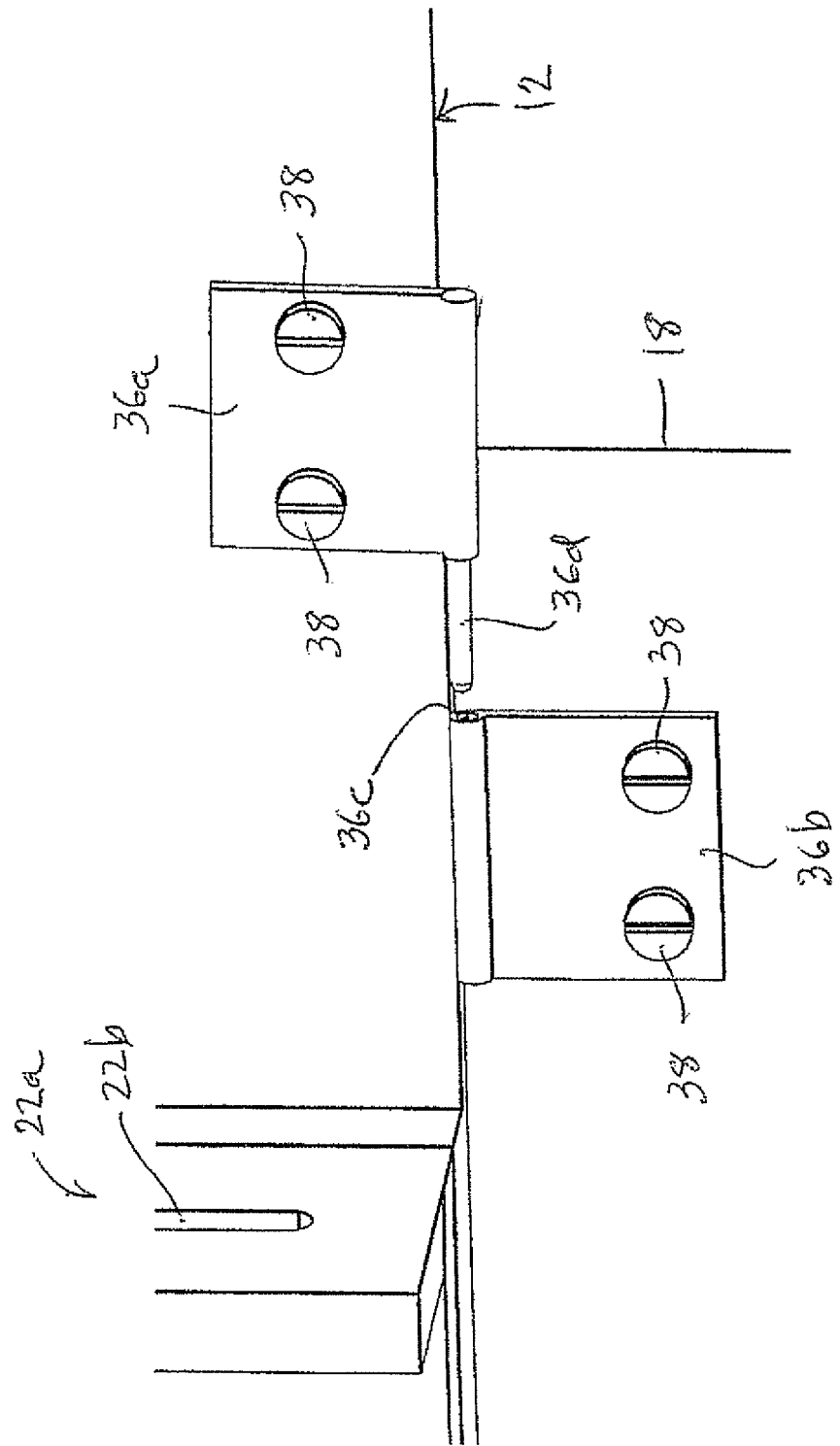
FIG. 7 is a perspective view showing additional details of the separatable hinges shown in FIG. 6.
Figure 8:
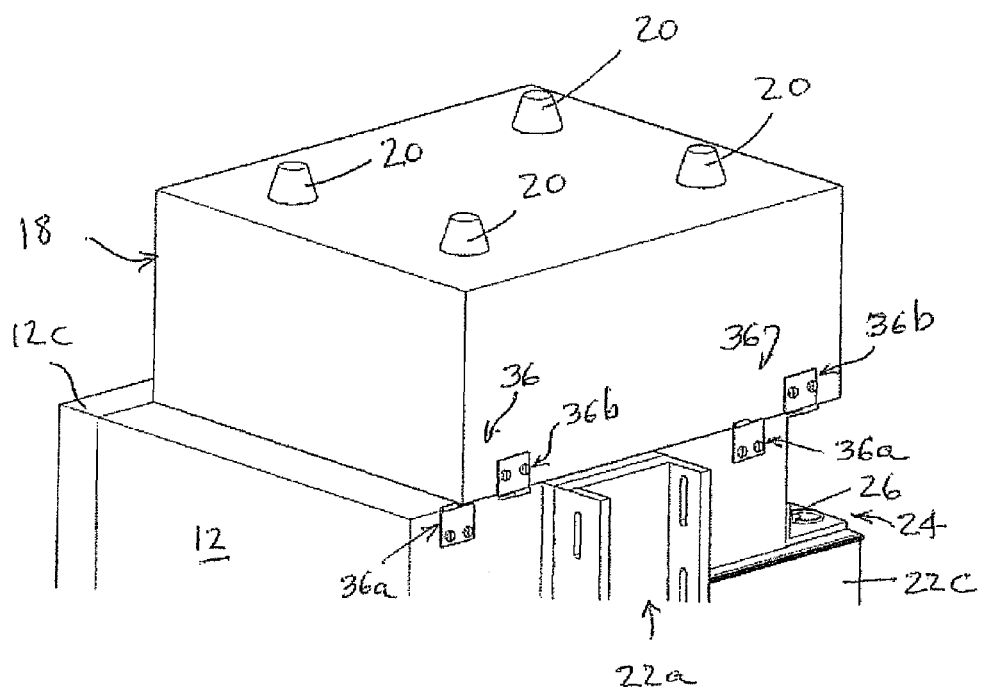
FIGS. 8 and 9 show the manner in which the removable cover is secured to the top of the camera enclosure by means of the separatable hinges and/or removed therefrom after use for reattachment to the bottom of the enclosure.
Figure 9:
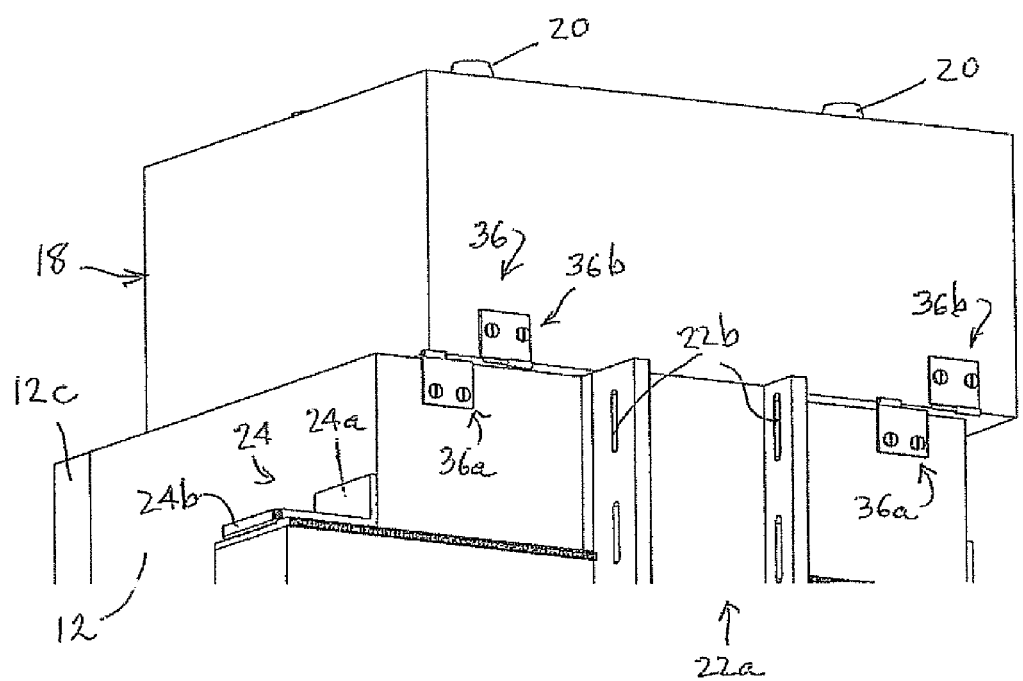

As indicated, the important feature of the present invention is the removable cover 18 that can be readily and conveniently removed from the bottom or proximate end 12a of the case and placed and attached to the remote or top end 22b of the case 12. Any suitable fasteners for allowing such quick disconnect or connect can be used. Referring to FIGS. 6-9, detachable hinges 36 are shown secured by screws and include fixed hinged portions 36a secured to the main case or housing 12 and movable hinge portions 36b secured to the cover 18. As best shown in FIG. 7, the fixed hinge portions 36a have channels 36c and the removable portions 26b have pins 36d dimensioned to be readily received within the channels 36c. By shifting the cover laterally as suggested in FIGS. 6-9, the hinges can be separated, the cover removed and detached from the case 12 and reattached to the opposing end using similar fixed hinge portions 36a. Other detachable fasteners that may be used in lieu of the hinges shown. By way of example, turn lock fasteners, catches or latches, tick-tite closures, toggle clips, and ring and hook fasteners can be used with different degrees of advantage.

Figure 10:
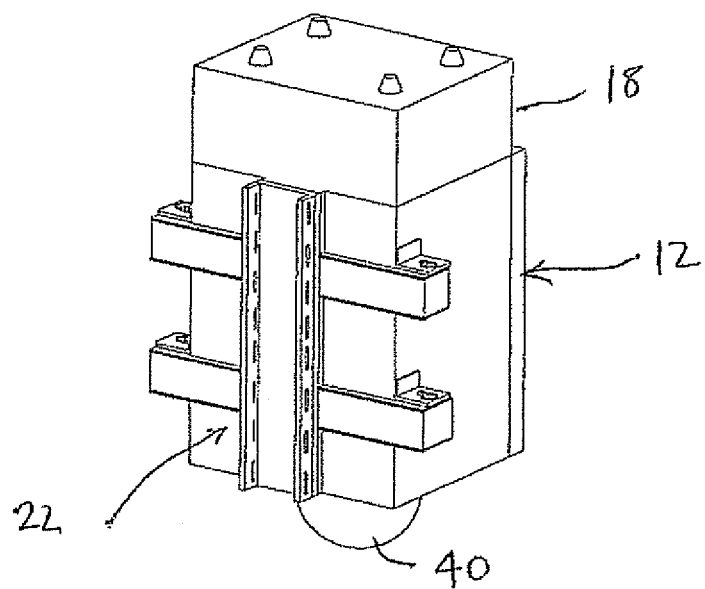
FIG. 10 is a perspective view showing the removable cover secured to the top of the camera enclosure and the initially protected dome exposed at the bottom of the enclosure to allow surveillance with the internal camera.
Figure 11:
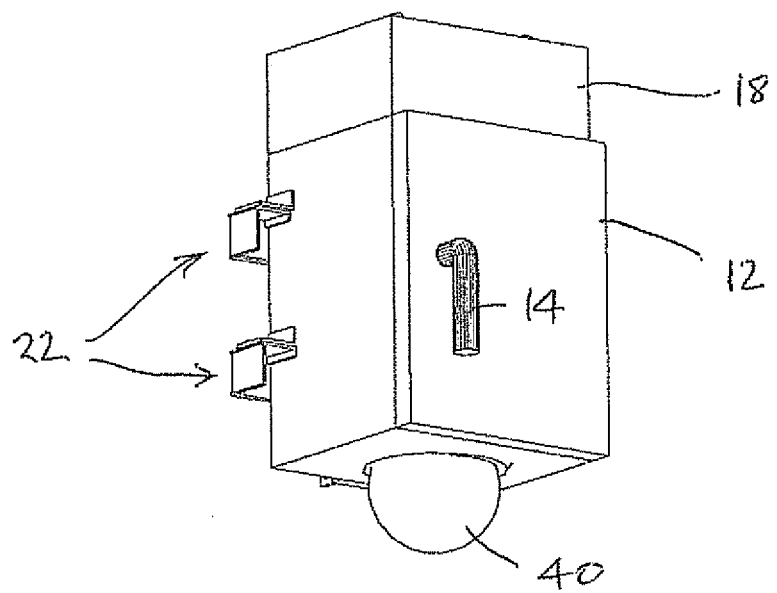
FIGS. 11 and 12 are front and rear perspective views of the arrangement shown in FIG. 10.
Figure 12:
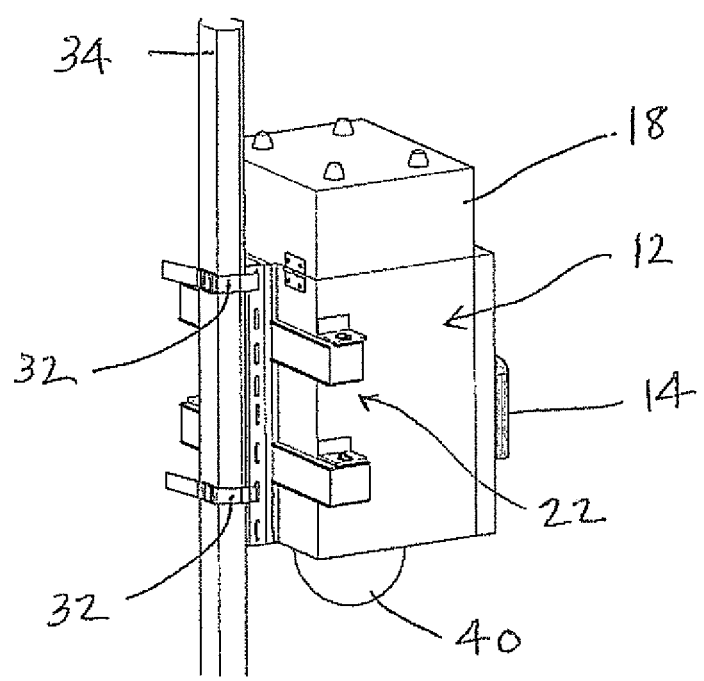

Referring to FIGS. 10-12, a dome 40 is shown at the bottom 12a of the housing after the cover 18 has been removed from the bottom of the housing or case and flipped 180° and secured to the top of the case, showing the arrangement when the enclosure is used and the camera can survey the area through the dome 40. When the enclosure is no longer used for that purpose it can be covered again as shown in FIG. 2, for example, whether or not the unit is to be transported to another location or simply protected from the elements or otherwise when surveillance is not desired.

It will be clear, therefore, that the cover 18 is normally a part of the enclosure. By simply separating it from one end and attaching it to the other end, the dome 40 can be protected when used without the need for other protective or packing materials to protect the dome against scratching, cracking, etc. that would deteriorate the performance of the camera. This way, the dome is always in perfect condition for use any time when it is mounted at a permanent or temporary location.

Referring now to FIGS. 13-19, a second embodiment of the invention is illustrated and designated by the reference numeral 10'. The two embodiments share the features that they are both mountable on a pole and include a support structure that has a first surface suitable for abutment against a surface the enclosure or housing or cabinet and a second surface suitable for abutment against the pole, typically having circular or hexagonal cross sections. Connecting members are provided with both embodiments for selectively securing the case to the support structure. However, once so supported, they both have the ability to remove the lower protective cover initially mounted on the bottom of the case and flipped 180° and placed on and securely attached to the top of the enclosure, housing or cabinet where it is securely retained until the camera enclosure is to be removed from the pole at which time the cover is again replaced on the bottom of the case, housing or enclosure to cover and protect the camera dome to ready the unit for transport.

Figure 14:
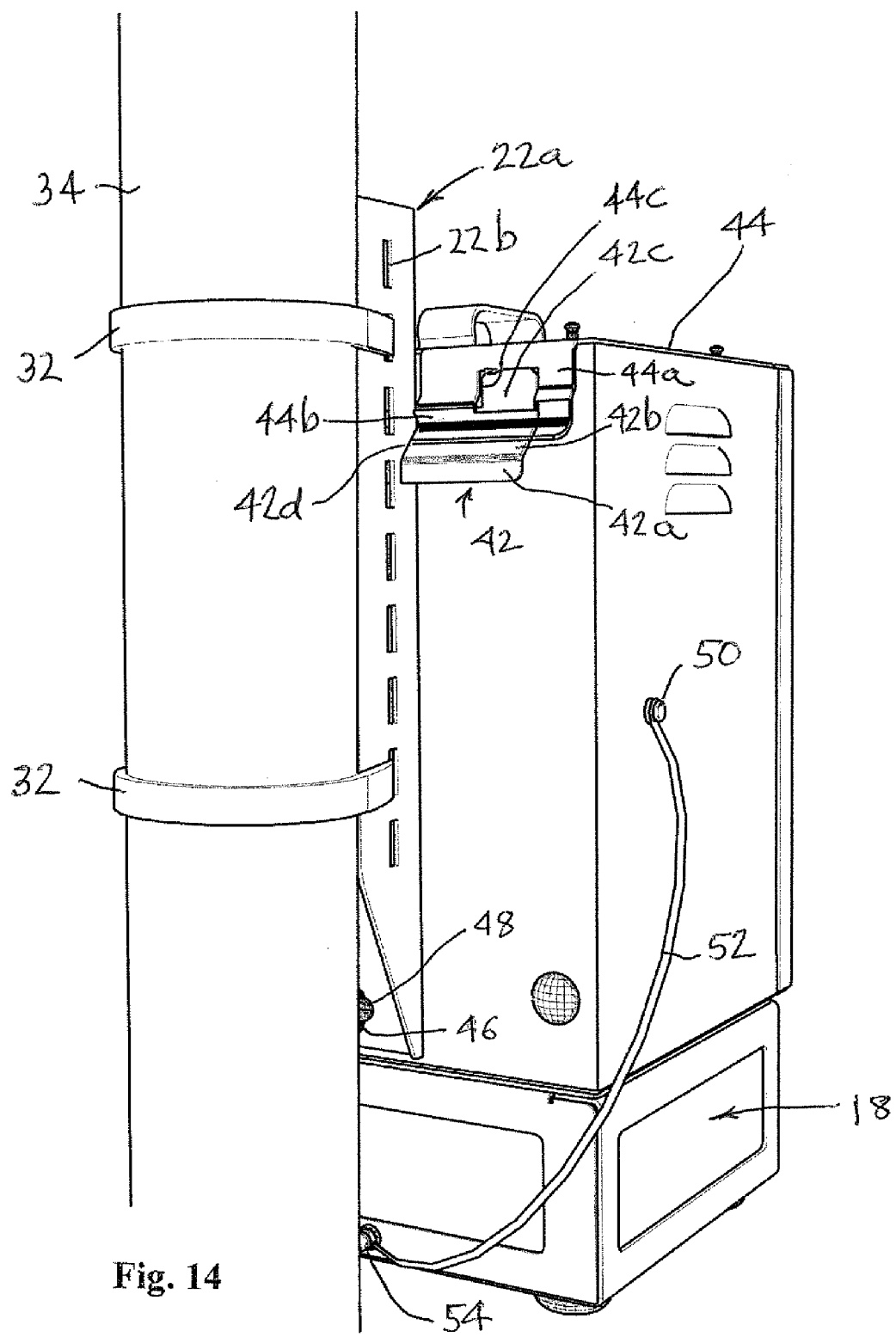
FIG. 14 is a rear perspective view of the embodiment shown in FIG. 13.

Referring to FIGS. 14, 15, 17-19 extending laterally to each side of the upright channel 22a are opposing wing members 42 including lower portions 42a and upper portions 42b, the upper portions being inclined forwardly, as viewed in FIG. 14, and terminated with a upwardly-directed tab 42c. While the specific configuration of the tab 42c is not critical, as will become evident, in the embodiment shown the tab 42c is generally rectangular and is oriented vertically when the channel 22a is mounted on a vertical post. The lower portions 42a and the tabs 42c are, therefore, substantially parallel to each other but horizontally offset from each other so that the portions 42a are within the dimensions of the side walls of the channel 22a while the tabs 42c are arranged forwardly of the channel.

Figure 20:
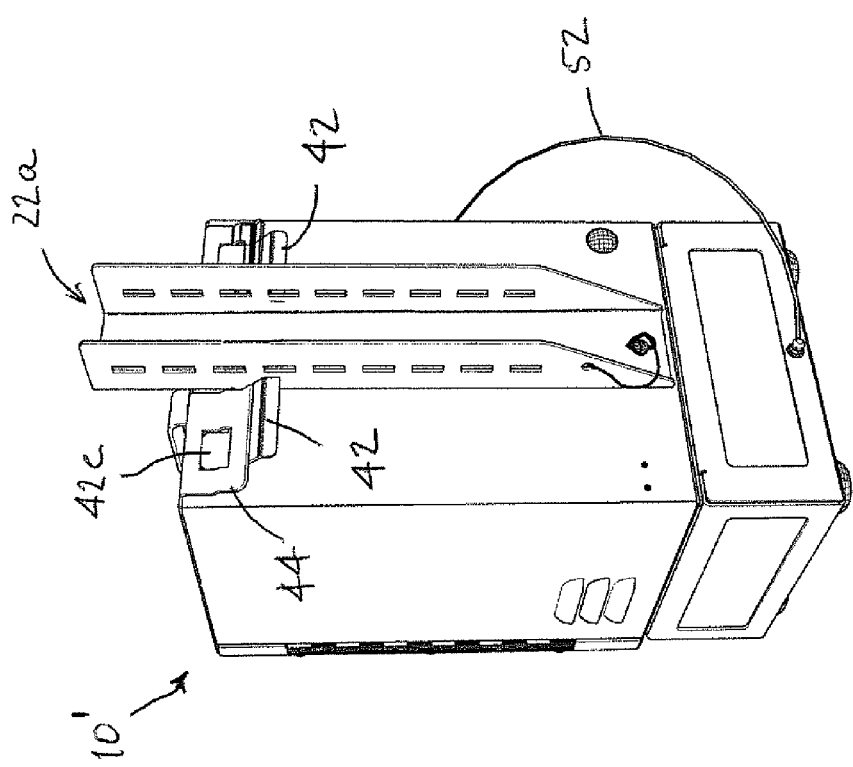

Also referring to FIG. 20 the wing members 42 and the channel 22a form part of a support member for the housing, enclosure or cabinet, as previously suggested. In the second embodiment, however, the upper wall of the housing, or cabinet enclosure is formed, at the rear thereof, with top wall extensions 44 spaced from each other to correspond to the positions of the wing members 42 on the channel 22a. Each extension 44 includes a generally vertical portion 44a that extends vertically downwardly at the rear of the cabinet or housing and is formed with an outward extension 44b rearwardly in relation to the vertical portion 44a. The portions 44a, 44b are provided with openings, windows or apertures 44c dimensioned to receive the upwardly directed or extending tabs 42c. The outwardly extending portions 44b make contact with the inclined upper portion 42b to slide thereon when aligned and lowered relative thereto to draw the cabinet rearwardly towards the channel 22a when the housing, cabinet or channel are aligned as shown and allowed to be lowered until the tabs 42c are fully received within the openings or windows 44c.

The height of the channel 22a is preferably selected to normally extend above the upper wall 44 so that a user can visually align the cabinet and center it to facilitate placement of the channel 22a between the two laterally spaced wing members 42. As should be clear, once so aligned the cabinet or enclosure can be lowered to provide the engagement and support described. Once the cabinet or enclosure is fully lowered it centers itself in relation to the channel 22a and, once fully seated, a hole 46 in the cover becomes aligned with a corresponding screw or other fastener 48, such as a quarter-turn wingnut or any other locking screw to secure the cover against vertical upward movement relative to the case, cabinet, enclosure or housing 12. This prevents the cover from being inadvertently or improperly lifted and removed or separated from the housing or cabinet.

Figure 13:
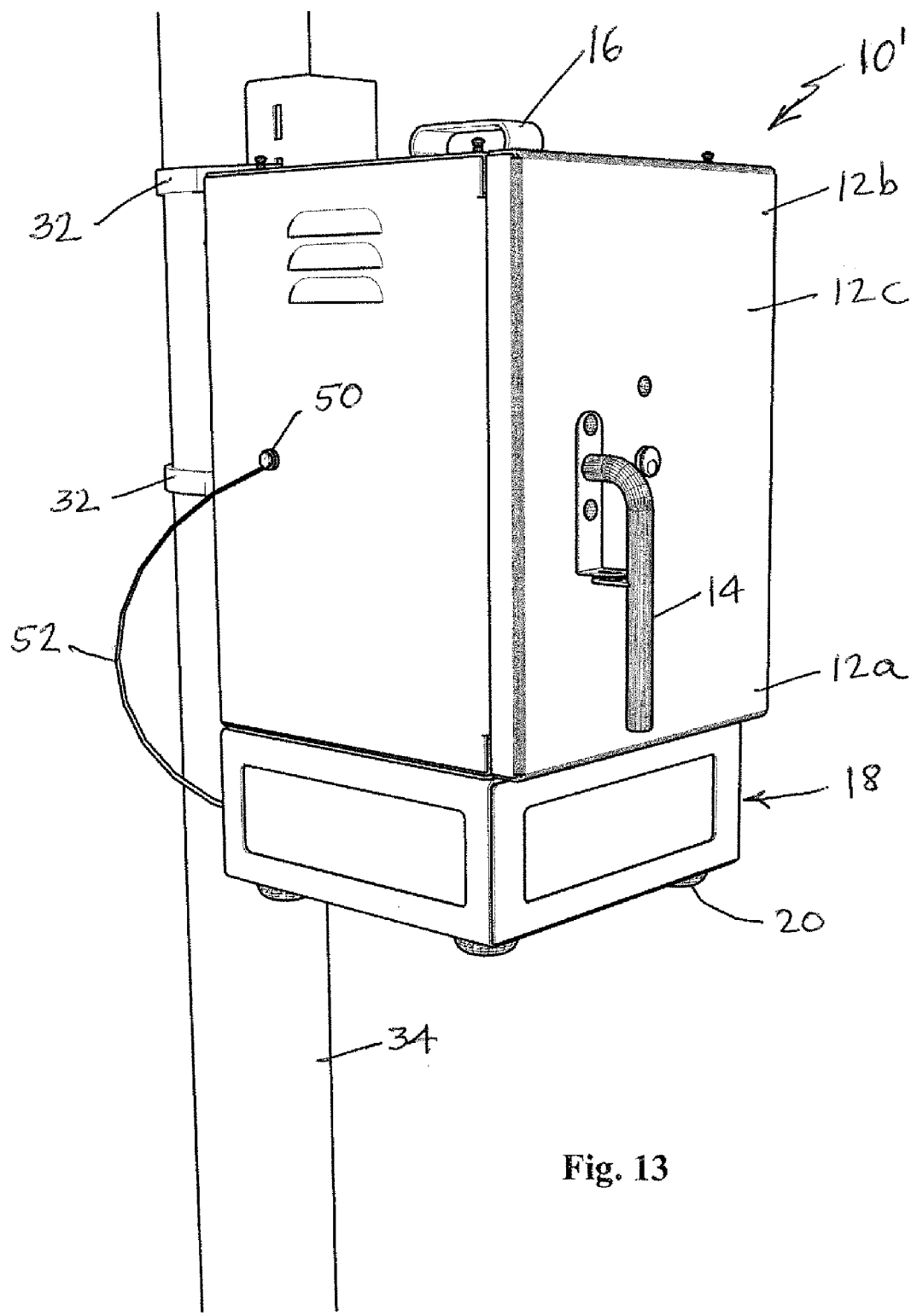
FIG. 13 is a front perspective view of a second embodiment in accordance with the invention.
Figure 15:
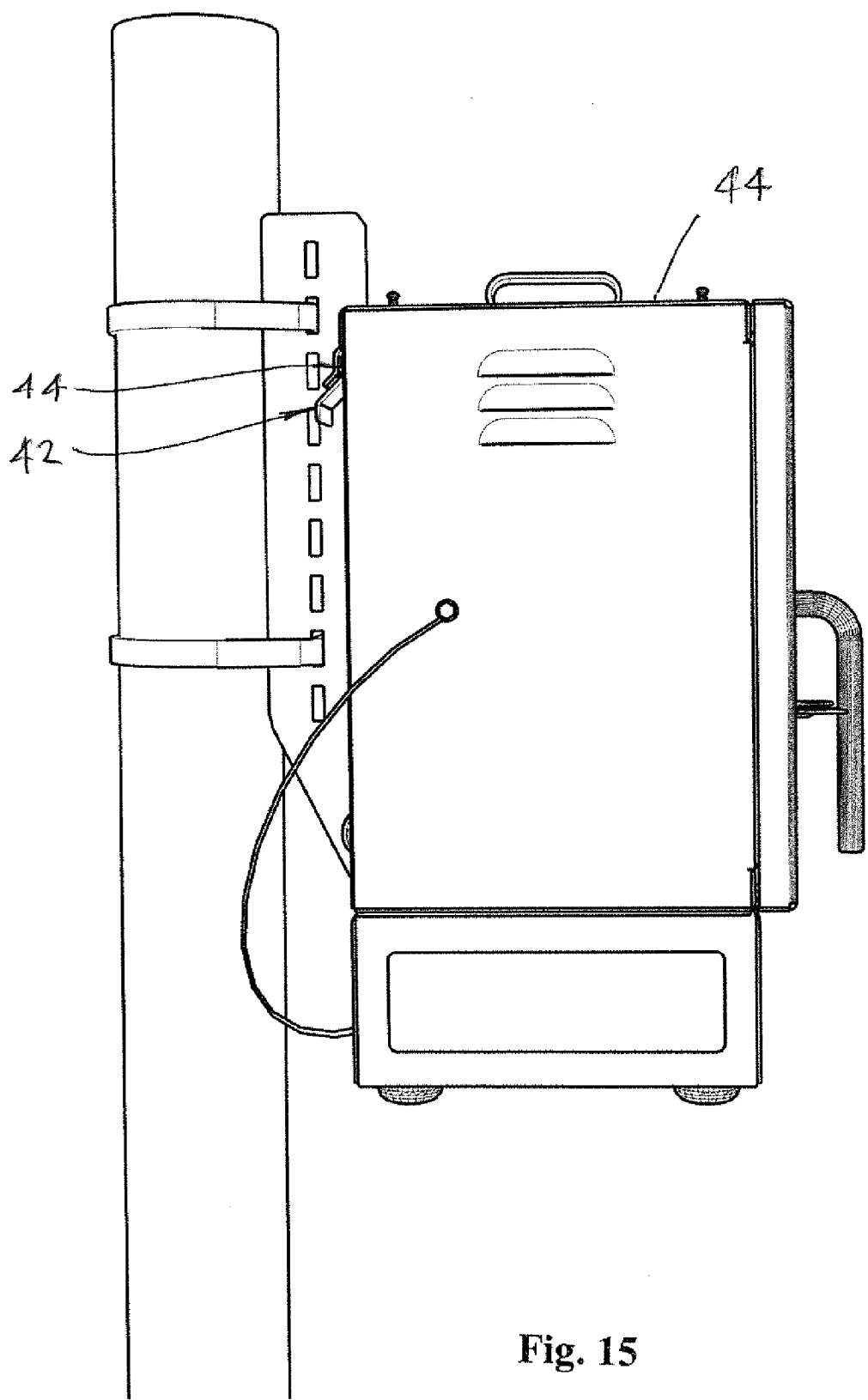
FIG. 15 is a side elevational view of the embodiment shown in FIGS. 13 and 14.
Figure 16:
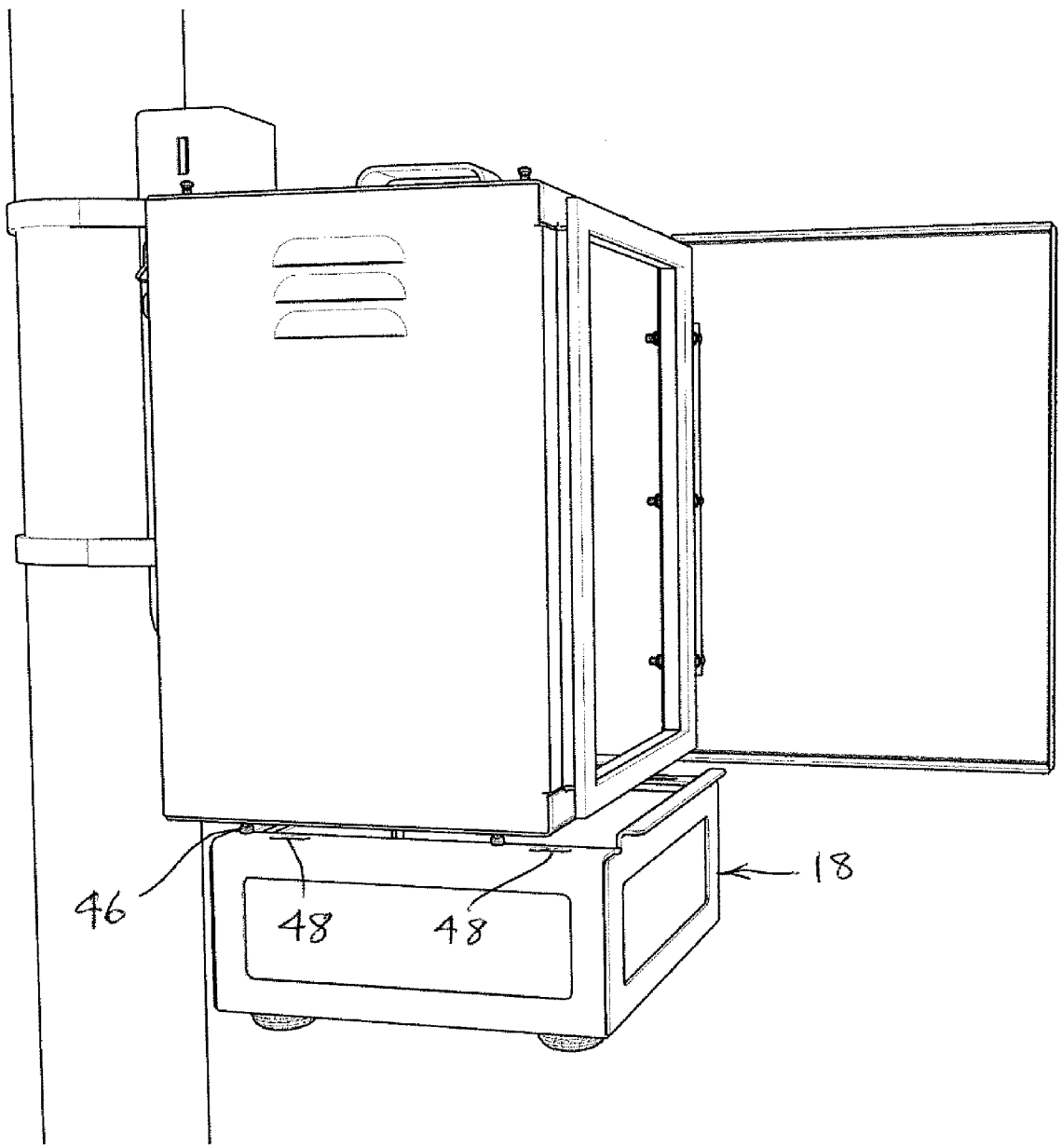
FIG. 16 is a perspective view of the embodiments shown in FIGS. 13-15, showing the camera dome cover removed from the main enclosure or cabinet and showing some details of the shoulder bolts and associated slots in the cover for engagement with the bolts.
Figure 17:
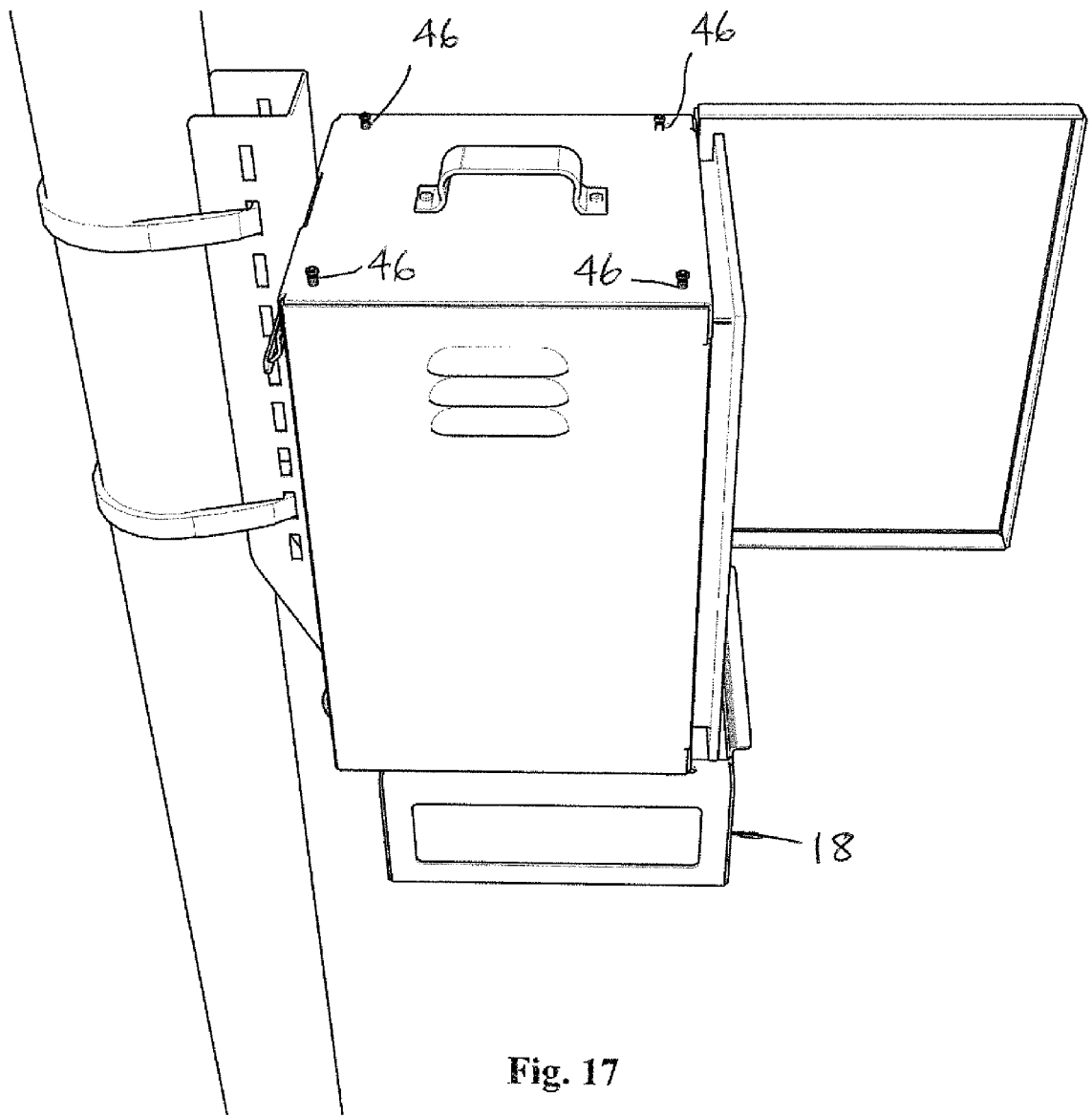
FIG. 17 is a top perspective view of the cabinet or housing shown in FIGS. 13-16 showing the locations and details of the shoulder bolts receivable within associated slots in the protective cover.
Figure 18:
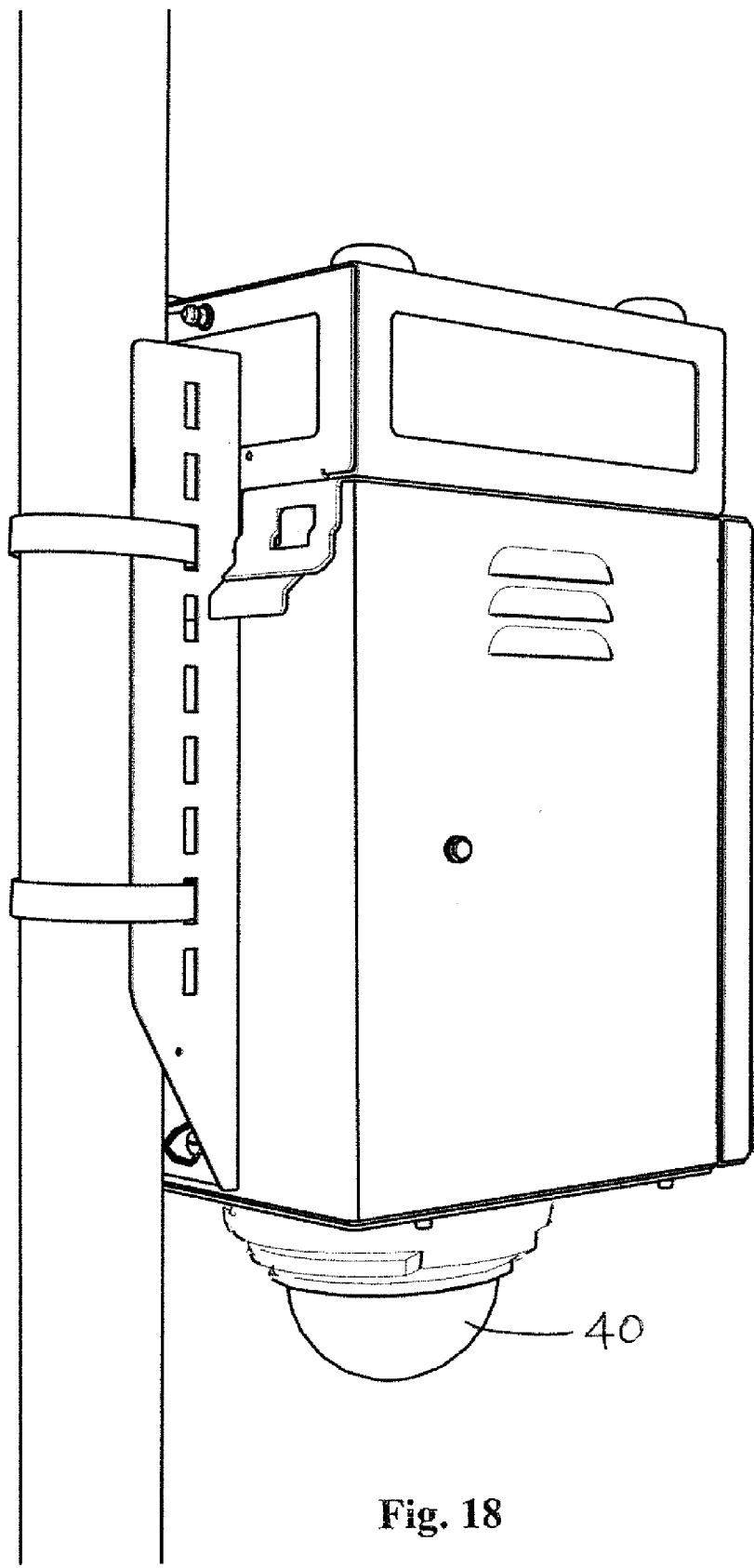
FIG. 18 is similar to FIG. 14 shown with the cover removed from the lower part of the cabinet and placed on the upper part of the cabinet to expose the camera dome.
Figure 19:
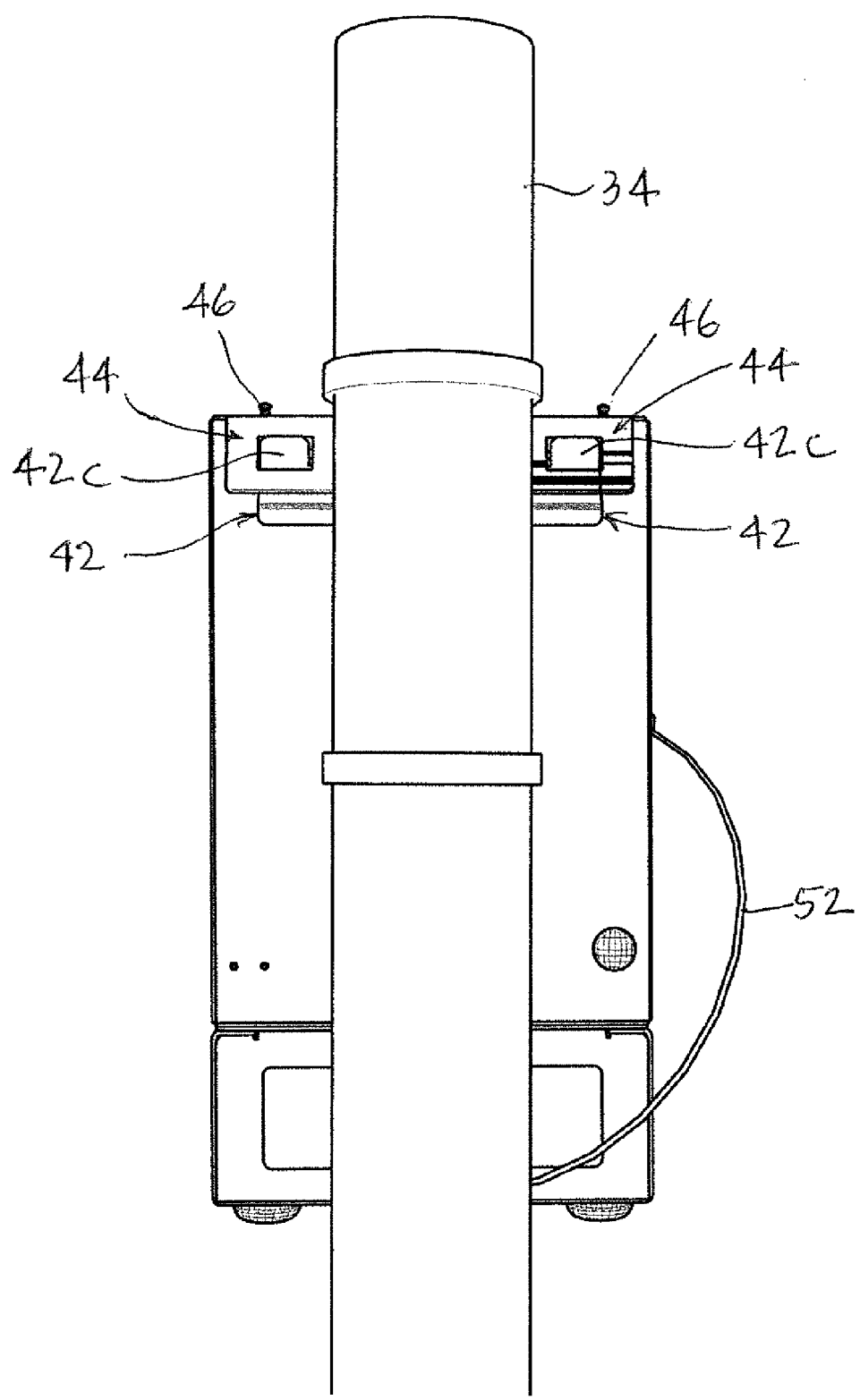
FIGS. 19 and 20 are rear elevational view of the cabinet of the second embodiment illustrating the self aligning feature of the cabinet with the post and the laterally spaced wing members that engage the support channel attachable to a post.

In FIGS. 13-15 the cover 18 is shown in its protective position, at the lower end of the cabinet, enclosure or housing wherein the cover 18 protects the camera dome as discussed above. Referring to FIGS. 16 and 17, the housing, enclosure or cabinet 10 is provided with a plurality of shoulder bolts at the respective upper and lower walls and associated key-shaped slots 48 on the cover 18. The shoulder bolts 46 are dimensioned to be received through the enlarged ends of the key-shaped slots and then moved into the narrow ends of the slots to effectively engage or disengage the cover 18 from the housing. In FIGS. 16 and 17, the cover 18 is shown moved slightly forwardly of the housing or cabinet as during the step of connecting or disengaging the cover from the cabinet. Once the cover is disengaged from the bottom shoulder bolts the cover can be moved to the top of the cabinet or housing, flipped 180° and secured to the top of the cabinet by having the slots in the cover engage the upwardly extending shoulder bolts. Once the shoulder bolts have been received within the associated slots the cover 18 can be pushed rearwardly to effectively engage and connect these members to each other. This exposes the camera dome 40, as discussed with the previous embodiments. As shown in FIGS. 14, 15 and 19, for example, any suitable fastener 50, such as a locking screw, can be used to secure a lanyard or any other cord 52 at one end, the other end being secured to the back of the cover 18 by means of another similar fastener, such as a screw 54, as shown in FIG. 14. The lanyard 52 is selected to provide sufficient strength and tension to support the weight of the cover 18 if dropped. Typically, the cover 18 may weigh 5-10 lbs and the lanyard 52 is selected to withstand tension of 100 or more pounds to provide a good safety margin in the event that the cover is inadvertently dropped when moving the cover from the bottom of the housing to the top thereof, or vice a versa. Since the enclosure may be mounted on a pole or post at a high elevation the lanyard is intended to prevent the cover from dropping and creating injury to a person below. The screw 50 can be connected to either of the side panels or walls of the housing, depending on the position of the door hinge and the direction that the door opens to minimize interference with the opening and closing of the front door 12b.

While two embodiments have been shown that facilitate the attachment of the cabinet or housing to a vertical channel, other methods will become evident to those skilled in the art. In each case, the construction used needs to facilitate the mounting of the cabinet on the pole and subsequent movement of the cover 18 between the top and the bottom of the cabinet, once so mounted, preferably by one person in the field.

While the invention was illustrated and described as mobile surveillance camera convertible enclosure for protecting camera dome during transportation, it is not intended to be limited to the detail shown, since it will be understood that various emotions, modifications, substitutions and changes in the forms and details of the formulations and constructions illustrated and its operation can be made by those skilled in the art without departing in any way from the spirit and scope of the present invention.

What is claimed:

1. An enclosure for a surveillance camera comprising a housing having front, rear, top, bottom and opposing side walls; a camera dome projecting downwardly below said bottom wall;
   a support structure attachable to a vertical post for supporting said housing on a post;
   a cover selectively attachable to both said top and bottom walls, said cover normally being attached to said bottom wall to cover and protect said camera dome during transport or when surveillance is not required and attached to said top wall to expose said camera dome when in use during surveillance, said top and bottom walls being provided with connecting means for readily removing or securing said cover by flipping said cover 180° when moving said cover between said top and bottom of said housing when mounted on said support structure.

2. In the enclosure defined in claim 1, wherein said support structure includes an elongate channel and at least one transverse arm dimensioned to engage said housing.

3. In the enclosure defined in claim 2, wherein a pair of spaced arms are provided along said elongate channel.

4. In the enclosure defined in claim 2, wherein said elongate channel has a U-shaped cross-section open in a direction facing away from said housing when supporting said housing.

5. In the enclosure defined in claim 2, wherein said shannel is provided with spaced apertures or slots along at least a portion of its elongate length to enable said elongate channel to be secured to the post by means of at least one strap or other elongate fastener.

6. In the enclosure defined in claim 2, wherein said at least one arm is provided with connecting portions positonable in close proximity to said opposing side walls, said housing being provided with brackets or flanges on said opposing side walls arranged to register with said connectin.g portions to support said housing by said at least one arm.

7. In the enclosure defined in claim 2, further comprising locking means for selectively locking and unlocking said housing from said at least one arm.

8. In the enclosure defined in claim 7, wherein said locking means comprises a lock pin.

9. In the enclosure defined in claim 1, wherein said connecting means comprises separable mating hinge portions, a first of said mating hinge portions being mounted on said cover and a second of said hinge portions being mounted at said top and bottom walls of said housing, said first of said mating hinge portions being mateable with either one of said second of said hinge portions, whereby said cover can be readily attached and detached from either one of said top or bottom walls.

10. In the enclosure defined in claim 1, further comprising an elongate cord secured at one end to said housing and secured at an opposing end to said cover, said cord having a length to allow free movement and attachment of said cover to both said top and bottom walls of said housing while preventing damage to said cover if inadvertently released or dropped.

11. In the enclosure defined in claim 1, further comprising securing means on said top and bottom walls and said cover to selectively secure said cover to one of said top and bottom walls when placed directly over said top wall or below said bottom wall to thereby prevent said cover from being inadvertently or improperly lifted or removed or separated from said housing.

12. In the enclosure defined in claim 1, wherein said support structure includes an elongate channel and an upwardly inclined wing member secured to said elongate channel, a downwardly inclined wall extension on at least one of said top and rear walls arranged to engage an associated upwardly inclined wing member to facilitate registrations of said inclined wall extension and with an inclined wing member for supporting said housing thereon.

13. In the enclosure defined in claim 12, wherein opposing wing members are provided extending laterally to each side of said elongate channel and wall extensions are provided on said housing arranged to register with and be supported by said opposing wing members.

14. In the enclosure defined in claim 13, wherein said opposing wing members include upwardly extending tabs and said wall extensions include openings or windows dimensioned to receive associated tabs.

15. In the enclosure defined in claim 11, wherein said securing means comprises a hole in one said top and bottom walls and said cover and a fastener in the other of said top and bottom walls and said cover, said fastener being configured to be received within said hole to provide locking engagement.

16. In the enclosure defined in claim 15, wherein said fastener comprises a locking screw.

17. In the enclosure defined in claim 16, wherein said locking screw comprises a quarter turn wing nut.

18. In the enclosure defined in claim 16, wherein said locking screw comprises a shoulder bolt.

19. In the enclosure defined in claim 15, wherein said hole is a key-shaped slot in said cover and said fastener comprises a shoulder bolt on said top and bottom walls dimensioned to be received through enlarged ends of said key-shaped slot and movable into narrow ends of said slot to engage and retain said cover to said housing.

20. In the enclosure defined in claim 1, further comprising at least one of a carrying handle on said top wall for carrying said enclosure when said cover is secured to said bottom wall and rubber feet on said cover when said enclosure is secured to said bottom wall and rested on the ground or other support surface.

* * * * *